United States Patent
Li et al.

(10) Patent No.: US 12,387,094 B2
(45) Date of Patent: Aug. 12, 2025

(54) PHOTONIC TENSOR ACCELERATORS FOR ARTIFICIAL NEURAL NETWORKS

(71) Applicant: University of Central Florida Research Foundation, Inc., Orlando, FL (US)

(72) Inventors: Guifang Li, Orlando, FL (US); Shuo Pang, Orlando, FL (US); He Wen, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 928 days.

(21) Appl. No.: 17/432,618

(22) PCT Filed: Oct. 15, 2019

(86) PCT No.: PCT/US2019/056239
§ 371 (c)(1),
(2) Date: Aug. 20, 2021

(87) PCT Pub. No.: WO2020/180351
PCT Pub. Date: Sep. 10, 2020

(65) Prior Publication Data
US 2022/0164642 A1    May 26, 2022

Related U.S. Application Data

(60) Provisional application No. 62/842,771, filed on May 3, 2019.

(51) Int. Cl.
*G06N 3/067*    (2006.01)
*G06N 3/048*    (2023.01)
(Continued)

(52) U.S. Cl.
CPC ........... *G06N 3/0675* (2013.01); *G06N 3/048* (2023.01); *H04B 10/54* (2013.01); *H04B 10/58* (2013.01)

(58) Field of Classification Search
CPC ........ G06N 3/048; G06N 3/044; G06N 3/045; H04B 10/54; H04B 10/58
See application file for complete search history.

(56) References Cited

U.S. PATENT DOCUMENTS 7,515,828 B2    4/2009    Gumaste et al.
8,027,587 B1    9/2011    Watts
(Continued)

FOREIGN PATENT DOCUMENTS

WO    WO2016028363    2/2016

OTHER PUBLICATIONS

Hamerly et al. Large-Scale Optical Neural Networks Based on Photoelectric Multiplication, Nov. 12, 2018, Physical Review, All (Year: 2018).*

(Continued)

*Primary Examiner* — Phenuel S Salomon
(74) *Attorney, Agent, or Firm* — Fleit Intellectual Property Law; Jon Gibbons

(57) ABSTRACT

Photonic units for vector-vector multiplication, matrix-vector multiplication, matrix-matrix multiplication, batch matrix-matrix multiplication, and tensor-tensor multiplication are described. Multiplications are through coherent mixing and square-law detection. There are many dimensions—wavelength, vector mode, quadrature, and three dimensions of space—that can be used to construct photonic accelerators. The encoded input vector or input matrix is fanned out into a desired number of copies and mixed with the corresponding encoded local oscillators containing the weight vectors comprising the weight matrix. Any subset of (Continued)

two (three) dimensions can be used to construct photonic accelerators for matrix-vector (matrix-matrix) multiplications. Multiple dimensions can be combined into a hyperdimension to increase the scalability. Each dimension, each non-overlapping subset of a dimension, or each non-overlapping subset of a hyperdimension, can be used independently to construct a photonic tensor accelerator (PTA) for batch matrix multiplication, or tensor multiplication operations.

20 Claims, 6 Drawing Sheets

(51) Int. Cl.
  H04B 10/54     (2013.01)
  H04B 10/58     (2013.01)

(56) References Cited

U.S. PATENT DOCUMENTS

| | | | |
|---|---|---|---|
| 9,354,039 | B2 | 5/2016 | Mower et al. |
| 9,791,258 | B2 | 10/2017 | Mower et al. |
| 10,359,272 | B2 | 7/2019 | Mower et al. |
| 10,619,993 | B2 | 4/2020 | Mower et al. |
| 2011/0194172 | A1* | 8/2011 | Esteban Martin ........ G02F 1/39 359/330 |
| 2014/0016168 | A1* | 1/2014 | Marandi .................. G06E 1/00 359/107 |
| 2014/0199065 | A1* | 7/2014 | Bratkovski ............. H04J 14/04 398/44 |
| 2017/0366270 | A1* | 12/2017 | Ashrafi ................... H04J 14/07 |
| 2018/0069631 | A1* | 3/2018 | Ashrafi ................... H04J 14/07 |
| 2018/0107237 | A1 | 4/2018 | Andregg et al. |
| 2019/0331912 | A1* | 10/2019 | Tait ......................... G02F 1/225 |
| 2019/0354894 | A1* | 11/2019 | Lazovich ................. G06E 1/00 |
| 2019/0370644 | A1* | 12/2019 | Kenney .................. G06N 3/045 |
| 2020/0085285 | A1* | 3/2020 | Yamada ............. A61B 1/00057 |
| 2022/0094443 | A1* | 3/2022 | Bunandar ............... G06F 17/16 |
| 2022/0366308 | A1* | 11/2022 | Lazovich ................. G06E 1/00 |

OTHER PUBLICATIONS

Yang et al. On-chip CMOS-compatible optical signal processor; Jun. 4, 2012, Optical Society of America, vol. 20, No. 12 (Year: 2012).*
Bienvenu I. Ndagano; Encoding information into spatial modes of light; May 3, 2016; University of the Witwatersrand, pp. 1-90 (Year : 2016).*
George et al.; Electrooptic Nonlinear Activation Functions for Vector Matrix Multiplications in Optical Neural Networks; 2018; pp. 1-2 (Year: 2018).*
George et al. (Year: 2018).*
Bienvenu Ndagano (Year: 2016).*
Hamerly et al (Year: 2018).*
Yang et al. (Year: 2012).*
Martin Abadi, et al., TensorFlow: A system for large-scale machine learning, Google Brain, May 31, 2016, 18 pages.
T.A. Birks, et al., The Photonic Lantern, Advances in Optics and Photonoics 7, 107-167 (2015) dol: 10. 1364/AOP.7.000107, Received Dec. 16, 2014, 61 pages.
Z.I. Borevich and S.L. Krupetskii, Subgroups of the Unitary Group that Contain the Group of Diagonal Matrices, Plenum Publishing Corporation, 1981, 9 pages.
D.J. Brady, et al., Multiscale gigapixel photography, Nature, vol. 486, Jun. 21, 2012, 4 pages, Macmillan Publishers Limited 2012.
H. John Caulfield and Shlmi Dolev, Why future supercomputing requires optics, Magazine, Nature Photonics, vol. 4, May 2010, Commentary section, pp. 261-263.

Antoine Dejonckheere, et al., All-optical reservoir computer based on saturation of absorption, Optical Society of America, vol. 22, No. 9, Published on Apr. 29, 2014, pp. 10868-10881.
Francois Deport, et al., All-optical reservoir computing, 2012 Optical Society of America, Published Sep. 20, 2012, vol. 20, No. 20, pp. 22783-22795.
Nicholas K. Fontaine, et al., Scalable mode sorter supporting 210 Hermite-Gaussian modes, Optical Society of America, Preliminary Paper, 3 Pages.
Liang Gao, Single-shot compressed ultrafast photography at one hundred billion frames per second. Nature vol. 516, Dec. 4, 2014, pp. 77-85.
Jonathan K. George, et al., Neuromorphic photonics with electro-absorption modulators, Optics Express 5181, vol. 27 No. 4, Dated Feb. 18, 2019, 11 Pages.
Joseph W. Goodman, Operations Achievable with Coherent Optical Information Processing Systems, Proceedings of the IEEE, vol. 65 No. 1, Jan. 1977, 10 Pages.
Ryan Hamerly, et al., Large-Scale Optical Neural Networks based on Photoelectric Multiplication, Research Laboratory of Electronics, MIT, Cambridge, MA, Dec. 20, 2018, 18 Pages.
Geoffrey Hinton, et al., Deep Neural Networks for Acoustic Modeling in Speech Recognition, IEEE Signal Processing Magazine, Nov. 2012, pp. 82-97.
Gin Huang, et al., Structured Directional Coupler Pair for Multiplexing of Degenerate Modes, OFC/NFOEC Technical Digest 2013, Published in the US, 3 Pages.
Bin Huang, et al., All-fiber mode-group-selective photonic lantern using graded-index multimode fibers., Optics Express 224, Jan. 12, 2015, vol. 23, No. 1, 11 Pages., Journal.
Bin Huang, et al., Triple-clad photonic lanterns for mode scaling., Optics Express 13391, Research Article, vol. 26, No. 10, May 14, 2018, 7 Pages.
M.N. Islam, Ultrafast all-optical logic gates based on soliton trapping in fibers, Optical Society of America, Optics Letters, vol. 14, No. 22, Nov. 15, 1989, 3 Pages.
Bade et al., "Fabrication and Characterization of a Mode-selective 45-Mode Spatial Multiplexer based on Multi-Plane Light Conversion", Optical Society of America, 2018.
C Gao et al., "Non-circularly-symmetric Mode-group Demultiplexer Based on Fused-type FMF Coupler for MGM Transmission", Optical Society of America, 2018.
Brunner et al., "All-Optical Neuromorphic Computing in Optical Networks of Semiconductor Lasers", 2014.
Deng et al., "Controlled Propagation of Spiking Dynamics in Vertical-Cavity Surface-Emitting Lasers: Towards Neuromorphic Photonic Networks", IEEE Journal of Selected Topics in Quantum Electronics, vol. 23, No. 6, 2017.
Jia et al., "Caffe: Convolutional Architecture for Fast Feature Embedding", ACM, 2014.
Jouppi et al., "In-Datacenter Performance Analysis of a Tensor Processing Unit", ISCA, Jun. 2017.
Jain et al., "Optical transistor", Applied Physical Letters, 28, 719, American Institute of Physics, Aug. 28, 2008.
Katumba et al., "Low-Loss Photonic Reservoir Computing with Multimode Photonic Integrated Circuits", Scientific Reports, Feb. 8, 2018.
Krizhevsky et al., "ImageNet Classification with Deep Convolutional Neural Networks", 2012.
Abroille et al., "Efficient and mode selective spatial mode multiplexer based on multi-plane light conversion", Optical Society of America, 2014.
Larger et al., "High-Speed Photonic Reservoir Computing Using a Time-Delay-Based Architecture: Million Words per Second Classification", American Physical Society, 011015, 2017.
Ferreira De Lima et al., "Progress in neuromorphic photonics", Nanophotonics, pp. 577-599, 2017.
X. Lin et al., "All-optical machine learning using diffractive deep neural networks," Science (1004-1008), 2018.
S. A. Manavski, "CUDA compatible GPU as an efficient hardware accelerator for AES cryptography," in ICSPC 2007 Proceedings—2007 IEEE International Conference on Signal Processing and Communications, 2007.

(56) References Cited

OTHER PUBLICATIONS

M. Mathieu, M. Henaff, and Y. LeCun, "Fast Training of Convolutional Networks through FFTs," pp. 1-9, 2013.

P. Merolla, R. Appuswamy, J. Arthur, S. K. Esser, and D. Modha, "Deep neural networks are robust to weight pinarization and other non-linear distortions," Jun. 2016.

D. A. B. Miller, "Are optical transistors the logical next step?," Nat. Photonics, vol. 4, No. 1, pp. 3-5, Jan. 2010.

J.-F. Morizur et al., "Programmable unitary spatial mode manipulation," J. Opt. Soc. Am. A, vol. 27, No. 11, p. 2524, Nov. 2010.

Y. Paquot et al., "Optoelectronic reservoir computing," Sci. Rep., 2012.

H. T. Peng, M. A. Nahmias, T. F. De Lima, A. N. Tait, B. J. Shastri, and P. R. Prucnal, "Neuromorphic Photonic Integrated Circuits," IEEE J. Sel. Top. Quantum Electron., 2018.

L. Larger et al., "Photonic information processing beyond Turing: an optoelectronic implementation of reservoir computing," Opt. Express, vol. 20, No. 3, p. 3241, 2012.

D. Psaltis, D. Brady, X. G. Gu, and S. Lin, "Holography in artificial neural networks.," Nature, vol. 343, No. 6256, pp. 325-330, 1990.

G. Quintana-Orti, F. D. Igual, E. S. Quintana-Orti, and R. A. van de Geijn, "Solving dense linear systems on platforms with multiple hardware accelerators," ACM SIGPLAN Not., 2009.

M. Reck, A. Zeilinger, H. J. Bernstein, and P. Bertani, "Experimental realization of any discrete unitary operator," Phys. Rev. Lett., 1994.

R. F. Rutz, "Transistor-Like Device Using Optical Coupling Between Diffused P-N Junctions in GaAs," Proc. IEEE, 1963.

Y. Shen et al., "Deep learning with coherent nanophotonic circuits," Nat. Photonics, vol. 11, No. 7, pp. 441-446, Jul. 2017.

D. Silver et al., "Mastering the game of Go with deep neural networks and tree search," Nature, 2016.

K. Simonyan and A. Zisserman, "Very Deep Convolutional Networks for Large-Scale Image Recognition," pp. 1-14, 2014.

A. N. Tait et al., "Neuromorphic photonic networks using silicon photonic weight banks," Sci. Rep., 2017.

H. Takahashi, T. Saida, Y. Sakamaki, and T. Hashimoto, "Wavefront matching method: A new approach for need- priented waveguide design," in Conference Proceedings—Lasers and Electro-Optics Society Annual Meeting-LEOS, 2005.

H. F. Taylor, "Guided wave electrooptic devices for logic and computation," Appl. Opt., vol. 17, No. 10, p. 1493, May 1978.

T. Umezawa et al., "10-GHz 32-pixel 2-D photodetector array for advanced optical fiber communications," 2017.

K. Vandoorne et al., "Toward optical signal processing using Photonic Reservoir Computing," Opt. Express, vol. 16, No. 15, p. 11182, Jul. 2008.

K. Wagner and D. Psaltis, "Multilayer optical learning networks," Appl. Opt., vol. 26, No. 23, p. 5061, Dec. 1987.

Y. Wang, N. Zhao, Z. Yang, Z. Zhang, B. Huang, and G. Li, "Few-mode SDM receivers exploiting parallelism of free space," IEEE Photonics Journal, 2019.

Written Opinion of the International Searching Authorities for PCT Application No. PCT/US2019/56239, dated Jan. 14, 2020.

Bienvenu I. Ndagano, "Encoding information into spatial modes of light", School of Physics, University of Witwatersand, dissertation submitted for degree of Master of Science, May 2, 2016, pp. 1-74.

In Yang, et al., "On-chip CMOS-compatible optical signal processor", Optics Express, Jun. 34, 2012, vol. 20, No. 12. pp. 1-6.

Supplemental International Search Report, dated Jun. 7, 2022, Reference P657.EP.

* cited by examiner

| Accelerators | Speed Limit | Scalability |
|---|---|---|
| ASIC GPU/TPU | Digital Clock (~1 GHz) | 256x256 (64k) MACs [31] |
| Optical ML [36] | Not Reconfigurable | NA |
| Photoelectric [39] | Digital Clock (~1 GHz) | ~250k MACs |
| Coherent PIC [38] | 10s GHz | ~60k MACs |
| PTA (Proposed) | 10s GHz | ~10M MACs |

FIG. 3

PHOTONIC TENSOR ACCELERATORS FOR ARTIFICIAL NEURAL NETWORKS

CROSS-REFERENCE TO RELATED APPLICATIONS

This application is related to and claims priority to PCT Patent Application No. PCT/US2019/056239, entitled "PHOTONIC TENSOR ACCELERATORS FOR ARTIFICIAL NEURAL NETWORKS" filed on Oct. 15, 2019 which is related and claims priority to U.S. Provisional Patent Application No. 62/842,771, entitled "Photonic Tensor Accelerators for Artificial Neural Networks" filed on May 3, 2019, which is assigned to the same assignee as this application and the teachings of which are herein incorporated by reference in its entirety.

BACKGROUND

The present application relates generally to optical computing more specifically to photonic acceleration for vector-vector, matrix-vector, matrix-matrix, batch matrix-matrix, and tensor-tensor multiplication.

This application includes references denoted in brackets with numbers, e.g. [x] where x is a number. This numeric listing of the references is found at the end of this application. Further, these references are listed in the information disclosure statement (IDS) filed herewith. The teachings of each of these listed references is hereby incorporated hereinto by reference in their entirety Electronics and photonics, by and large, have staked out their respective technical roles in the information society so far. Due to the fermionic nature of electrons, electronics has dominated technologies for the generation and processing of information. Similarly, due to the bosonic nature of photons, photonics has dominated technologies for the transmission of information in recent decades, even though electronics also dominated communications technologies before the inventions of lasers and optical fibers. As has been anticipated for a long time, the processing power of electronic integrated circuits (ICs) will, sooner or later, fail to grow according to Moore's law. This anticipation has motivated the optics and photonics community to explore optical and photonic information processing on and off for the past half a century. These efforts include optical transistors [1], [2] and logic gates for general purpose optical computing [3], [4], as well as Fourier optics for special-purpose information processing [5]. However, by the end of 1980s, the mistakes of over-selling the role and capability of optics in computing had already set the field back several times, and rendered the field almost dormant in the ensuing two decades [6].

In recent years, ICs have indeed not been able to sustain the exponential growth according to Moore's law, primarily due to the difficulty in dissipating the heat from high-density power consumption associated with small device features required for increasing the clock rate. So, the limiting factor to scalability of ICs in computing power is not total power but power density. In the post-Moore's law era, industry's solution to scalability problem is constructing hardware accelerators [7], [8] with parallel computing structure and optimized local memory for specific computing purposes, such as graphical processing units (GPUs) and tensor processing units (TPUs), as oppose to the von Neumann architecture with a single CPU. Benefiting from these hardware accelerators, new applications based on artificial intelligence (AI)/machine learning (ML) implemented using artificial neural networks (ANN) have proliferated at virtually every corner in academia, industry and the society in general, despite the stagnation in raw IC processing power.

SUMMARY OF THE INVENTION

The invention includes a photonic unit for vector-vector multiplication, matrix-vector multiplication, matrix-matrix multiplication, batch matrix-matrix multiplication, and tensor-tensor multiplication. In the case of vector-vector multiplication, the photonic device includes a first optical multiplexer that receives a first optical signal representing a first vector, wherein each element in the first vector is encoded on a first degree of freedom (DOF)/dimension of light and is non-temporal during one multiplication cycle to produce a first multiplexed optical signal. The photonic unit includes a second optical multiplexer that receives a second optical signal, coherent with the first optical signal, representing a second vector wherein each element in the second vector is encoded with an identical element-to-orthogonal degree of freedom (DOF)/dimension of light mapping as the first vector to produce a second multiplexed optical signal. The photonic unit also includes a beam combiner that receives the first multiplexed optical signal from the first optical multiplexer and second multiplexed optical signal from the second optical multiplexer so as to combine them to produce an interference between the first optical signal and second optical signal containing multiplication results of the first vector and the second vector in a total interference intensity. This accumulation does not need an entire DOF, rather, a specific point or parameter in a DOF that has not been used for encoding.

In the case of N by M matrix-with M by 1 vector multiplication, the photonic unit includes a first optical multiplexer that receives at least a first optical signal representing at least a M by 1 vector with M elements, wherein each element in the M by 1 vector is encoded on a first orthogonal degree of freedom (DOF)/dimension of light and is non-temporal during one multiplication cycle to produce a first multiplexed optical signal, and wherein M is a positive integer greater than or equal to 1. The photonic unit includes an optical duplicator for reproducing at least the first optical signal representing the M by 1 vector into a plurality of N copies in N additional optical signals in a second orthogonal degree of freedom (DOF)/dimension of light, wherein N is a positive integer greater than or equal to 1. The photonic unit also includes N optical multiplexers, in the second orthogonal degree of freedom (DOF)/dimension of light, which is identical to the optical duplicator, each receiving M additional optical signals, wherein each of the M additional optical signals are coherent with the first optical signal, each of the N additional optical signals represent an independent row of a M by N matrix, wherein each element in a row of the M by N matrix is encoded with an identical element-to-orthogonal degree of freedom (DOF)/dimension of light mapping as the first optical signal representing the M by 1 vector, to produce N additional multiplexed optical signals. The photonic unit also includes at least one beam combiner that receives N copies of the first multiplexed optical signal from the first optical multiplexer and the N additional multiplexed optical signals from the N optical multiplexers so as combine them to produce N occurrences of interferences between the first optical signal and each of the N additional optical signals containing multiplication results of the M by N matrix and the M by 1 vector in N total interference intensities.

In the case of N by M matrix-with a M by W matrix multiplication, the photonic unit includes a first set of N optical multiplexers in a first orthogonal degree of freedom (DOF)/dimension of light that receives N optical signals where each of the N optical signals representing an independent row with M elements of a N by M matrix, wherein each element in each independent row of the N by M matrix is encoded on a second orthogonal degree of freedom (DOF)/dimension of light and is non-temporal during one multiplication cycle to produce N multiplexed optical signals, and wherein M and N are each a positive integer greater than or equal to 1. The photonic unit includes a first optical duplicator for reproducing each of the N multiplexed optical signals representing independent rows of a N by M matrix into a plurality of W copies in a third orthogonal degree of freedom (DOF)/dimension of light, wherein W is a positive integer greater than or equal to 1. The photonic unit also includes a second set of W optical multiplexers in the third orthogonal degree of freedom (DOF)/dimension of light, which is identical to the first optical duplicator that receives W additional optical signals, wherein each of the W additional optical signals are coherent with the N optical signals, each of the W additional optical signals representing an independent column with M elements of the M by W matrix, wherein each element in each independent column of the M by W matrix is encoded with an identical element-to-orthogonal degree of freedom (DOF)/dimension of light mapping as each element in each independent row of the N by M matrix to produce W additional multiplexed optical signals. The photonic unit includes a second optical duplicator for reproducing each of the W multiplexed signals representing independent column of the M by W matrix into a plurality of N copies in the first orthogonal degree of freedom (DOF)/dimension of light, which is identical to the first set of N optical multiplexers. The photonic unit also includes at least one beam combiner that receives two sets of N by W multiplexed optical signals representing appropriately duplicated rows or columns of each of the N by M matrix and the M by W matrix so as to combine them to produce N by W occurrences of interferences between each of row of the N by M matrix and the column of the M by W matrix containing multiplication results in N by W total interference intensities.

In the case of a batch of B, N by M matrices multiplied by a M by W matrix, the photonic unit includes a first set of N optical multiplexers in a first orthogonal degree of freedom (DOF)/dimension of light that receives N optical signals where each of the N optical signals representing an independent row each with M elements of a first M by N matrix, wherein each element in each independent row of the first M by N matrix is encoded on a second orthogonal degree of freedom (DOF)/dimension of light and is non-temporal during one multiplication cycle to produce N multiplexed optical signals, and wherein M and N are each a positive integer greater than or equal to 1. The photonic unit includes a first optical duplicator for reproducing each of the N multiplexed optical signals representing independent rows of a first N by M matrix into a plurality of W copies in a third orthogonal degree of freedom (DOF)/dimension of light of N by M matrices, wherein W is a positive integer greater than or equal to 1. The photonic unit includes a second multiplexer in a fourth orthogonal degree of freedom (DOF)/dimension of light that receives B optical signals each containing W copies, in a third orthogonal degree of freedom (DOF)/dimension, of the N multiplexed optical signals representing independent rows of one of a B N by M matrix, where B is positive integer greater than or equal to 1. The photonic unit includes a third set of W optical multiplexers in the third orthogonal degree of freedom (DOF)/dimension of light, which is identical to that used by the first optical duplicator that receives W additional optical signals, wherein each of the W additional optical signals are coherent with the N optical signals, each of the W additional optical signals representing an independent column with M elements of each of the M by W matrices, wherein each element in each independent column of the M by W matrix is encoded with an identical element-to-orthogonal degree of freedom (DOF)/dimension of light mapping as each element in each independent row of each of the N by M matrices to produce W additional multiplexed optical signals. The photonic unit includes a second optical duplicator for reproducing each of the W multiplexed signals representing independent column of the M by W matrix into a plurality of N copies in the first orthogonal degree of freedom (DOF)/dimension of light, which is identical to the first set of N optical multiplexers. The photonic unit includes a third optical duplicator in the fourth orthogonal degree of freedom (DOF)/dimension of light that produces B identical optical signals each containing N copies, in the first orthogonal degree of freedom (DOF)/dimension, of the W multiplexed signals representing independent column of each of the M by W matrices. The photonic unit includes at least one beam combiner that receives two sets of B by N by W multiplexed optical signals from the second multiplexer and the third optical duplicator to combine them to produce N by W occurrences of interferences containing summation of the multiplication of B distinct N by M matrix multiplied by the same M by W matrix, in N by W total interference intensities.

In the case of a multiplication of two tensors, where the first tensor has rank p and the second tensor has rank q, the shape of the first tensor is $[N_1, N_2, \ldots, N_{p-1}, M]$, and the shape of the second tensor is $[M, W_1, \ldots, W_{q-1}]$. $N_1, N_2, \ldots, N_{p-1}, M, W_1, \ldots, W_{q-1}$ are each a positive integer greater or equal to one. A photonic unit encodes the elements of the first tensor along the first rank to the $p^{th}$ rank to the first to the $p^{th}$ orthogonal degrees of freedom (DOF)/dimensions, respectively. The photonic unit includes a first set of optical duplicators for reproducing the multiplexed optical signals representing the tensors into a plurality of $W_1 \times W_2 \times \ldots \times W_{q-1}$ copies in the $(p+1)^{th}$ to the $(p+q)^{th}$ orthogonal degrees of freedom (DOF)/dimensions of light. The photonic unit also encode the elements of the second tensor along the first rank to the $q^{th}$ rank on to the $(p)^{th}$ to the $(p+q-1)^{th}$ orthogonal degrees of freedom (DOF)/dimensions, respectively, with an identical element-to-orthogonal degree of freedom (DOF)/dimension of light mapping as the duplicates of the $(p+1)^{th}$ to the $(p+q)^{th}$ orthogonal degrees of freedom (DOF)/dimensions of the first tensor. The photonic unit includes a second set of optical duplicators for reproducing the multiplexed signals representing the second tensor into a plurality of $N_1 \times N_2' \ldots \times N_{p-1}$ copies in the first to the $(p-1)^{th}$ orthogonal degrees of freedom (DOF)/dimensions of light, which are identical to the element-to-orthogonal degree of freedom (DOF)/dimension of light mapping as the first to the $(p-1)^{th}$ orthogonal degrees of freedom (DOF)/dimensions of the first tensor. The photonic unit includes at least one beam combiner that receives two sets of $[N_1, N_2, \ldots, N_{p-1}, M, W_1, \ldots, W_{q-1}]$ multiplexed optical signals from the two sets of optical duplicators to combine them to produce $[N_1, N_2, \ldots, N_{p-1}, W_1, \ldots, W_{q-1}]$ occurrences of interferences containing summation of the multiplication of $N_1 \times N_2 \times \ldots \times N_{p-1} \times W_1 \times \ldots \times W_{q-1}$ distinct M-element vector-vector multiplications in interference intensities.

The interference signal above for any of the vector-vector, matrix-vector, matrix-matrix, batch matrix-matrix and tensor-tensor multiplication typically enters either a nonlinear optical element, or the total interference intensity is converted into an electrical signal, which enters a non-linear electrical element.

In one example, encoding or duplication uses at least one of a wavelength, a spatial mode, a polarization, a quadrature, and a component of a wave vector. The spatial mode can be one of Hermite-Gaussian modes, Laguerre-Gaussian modes, or discrete spatial samples forming spatially orthonormal basis.

In another example, encoding or duplication uses a hyperdimension consisting of combinations of two or more degree of freedoms (DOFs)/dimensions of light.

In another example, for encoding or duplication, at least two orthogonal degrees of freedom (DOF)/dimensions of light are non-overlapping subsets of a dimension or a hyperdimension of light.

BRIEF DESCRIPTION THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a table of performance comparison among electronic and photonic accelerators;

DETAILED DESCRIPTION

Non-Limiting Definitions

Figure 1:
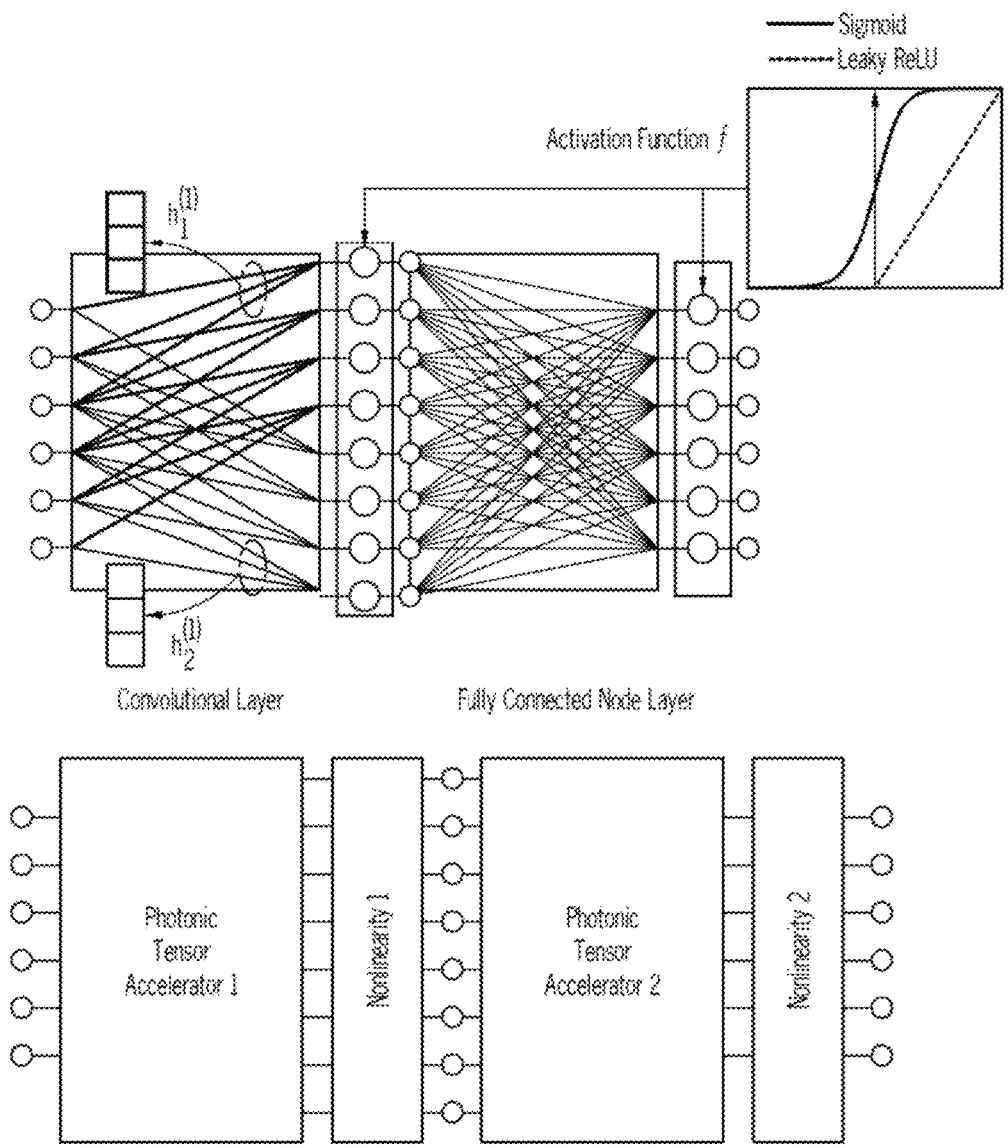
FIG. 1 is a diagram of an artificial neural network with a convolutional hidden layer and fully-connected out layer, and a diagram illustrating an example of the functionality of the invention, photonic tensor accelerator, in artificial neural networks' implementation.

The terms "a", "an" and "the" are intended to include the plural forms as well, unless the context clearly indicates otherwise c.

The phrases "at least one of <A>, <B>, ... and <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

The term "beam combiner" is a device that allows coherent beams to interfere with each other. It can be implemented by, but not limited to, reflective optics, refractive optics, diffractive optical elements, fiber optical devices, or a combination of such components.

The term "beam splitter" is a device that can split a propagating light into two or more paths. It can be implemented by, but not limited to, reflective optics, refractive optics, diffractive optical elements, fiber optical devices, or a combination of such components.

The term "element-to-orthogonal degree of freedom (DOF)/dimension of light mapping" is a correspondence between matrix or vector elements to independent parameters of light, including a wavelength, a spatial mode, a polarization, a quadrature, and a component of wave vector.

The term "hyperdimension" means consisting of combinations of two or more degree of freedoms (DOFs)/dimensions of light.

The term "subset of a dimension or hyperdimension" means a subset of independent parameters in one degree of freedom (DOF)/dimension of light or one hyperdimension of light.

The term "light" is electromagnetic radiation that includes both visible and non-visible portions of the light spectrum.

The term "multiplication cycle" means the mathematical multiply operation which is included during a single computational cycle.

The term "beam duplicator" is a device that generates two or more copies of incident light that have one or more prescribed parameters the same as the incident light, including wavelengths, spatial modes, polarizations, quadratures, and wave vectors. It can be implemented by, but not limited to, reflective optics, refractive optics, diffractive optical elements, fiber optical devices, or a combination of such components.

Background

The important roles electronic hardware accelerators (TPUs and GPUs) played clearly indicate that future developments in ANNs depend on advances in both software and hardware. However, currently, electronic hardware accelerators have already been pushed to their limits in term of scalability. Against this backdrop, there have been renewed efforts in exploring the role of optics in computing [17], including pushing optical interconnects to ever shorter length scales as well as demonstrating new computing paradigms such as optical neuromorphic computing [18]-[23] and optical reservoir computing [24]-[30]. Three major building blocks for ANNs and DNNs are:

1. Interconnects,
2. Matrix-vector and matrix-matrix multiplication, and
3. Nonlinearity.

Since optics and photonics can implement the first two functions as well as, if not better than, electronics; and optical nonlinearity at the per neuron level rather than the logic level is actually quite practical, now is the right time to explore the role of optics and photonics in ANNs and DNNs. We disclose the photonic tensor accelerator (PTA) that has a computing power several orders of magnitude higher than GPUs and TPUs, and is capable of matrix-vector multiplication, matrix-matrix multiplication, batch matrix multiplication, i.e., multiplying a 3D data cube (e.g., a batch of images) by a weight matrix as well as tensor-tensor multiplication in one clock cycle. In the remainder of this section, we first review the basics of electronic ANNs, followed by a brief description of relevant research in optical ANNs.

Artificial Neural Networks

There are three popular ANN models [31], namely, (a) multi-layer perceptrons, also known as fully-connected (FC) networks in which the output of each neuron is the nonlinear response of the linear combination of all neurons from the previous layer, (b) convolutional neural networks (CNN), in which the output of each neuron is the nonlinear response of a prescribed linear combination of (i.e., convolution of a kernel with) a subset of neurons from the previous layer, and (c) recurrent neural networks (RNN), in which the output of each neuron is the nonlinear response of the linear combination of both the neurons from the previous layer and neurons from the same layer but at a previous time. FIG. 1 shows an ANN with a convolutional hidden layer and a fully-connected output layer.

Figure 2:
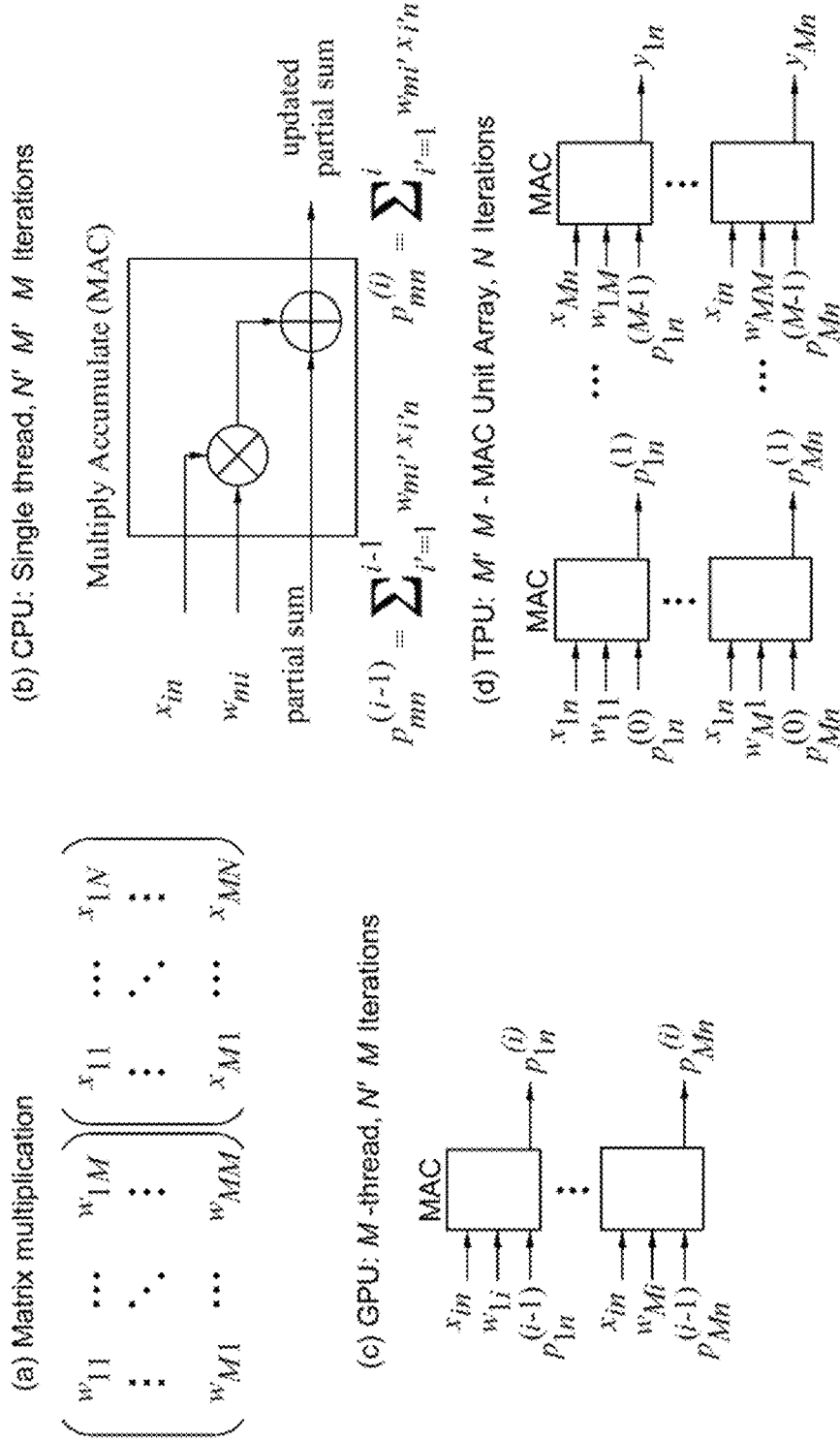
FIG. 2A is a diagram of a matrix multiplication reduced to multiply-accumulate operations and implemented using a CPU shown in FIG. 2B, a GPU shown in FIG. 2C, and a TPU shown in FIG. 2D with increased parallelization and improved energy efficiency in memory access.

Both convolution and linear combination can be reduced mathematically to matrix multiplications between a weight matrix $W \in \mathbb{R}^{M \times M}$ and a batch of input vectors $\{x_1, \ldots x_N\} \in \mathbb{R}^{M \times N}$. To improve matrix computation speeds in neural networks, data transformation and thread parallelization schemes are implemented in CPUs and GPUs [32], [33]. Though one may push process parallelization and the clock speed, the performance of the microprocessor is ultimately limited by on-chip power dissipation. A key metric to evaluate power efficiency is energy consumption per multiply-accumulate operation (MAC)—the essential operation for matrix multiplication. FIG. 2A is a diagram of a matrix multiplication reduced to multiply-accumulate operations and implemented using a CPU shown in FIG. 2B, a GPU shown in FIG. 2C, and a TPU shown in FIG. 2D with increased parallelization and improved energy efficiency in memory access. As shown in FIG. 2B, each MAC requires three memory reads (for filter weight, neuron input, and partial sum) and one memory write (updated partial sum).

In modern microprocessors, memory access consumes the majority of processing energy. Per data access, dynamic random-access memory (DRAM) consumes two orders of magnitude higher energy than small on-chip memory. Therefore, by optimizing the reusability of data stored on local memories, the total energy consumption can be greatly reduced. The challenge, however, is limited capacities of the local memories (several kilobytes) compared to DRAMs (tens of gigabytes). To address this challenge in memory access, application-specific integrated circuits (ASICs), shown in FIGS. 2C and 2D, explore new spatial architectures for computation acceleration. For example, Google's TPU, in which data storage are placed in registers close to the logic units, has demonstrated an energy efficiency of ~1 pJ/MAC, a 20-fold reduction compared to commercially available GPUs [31]. Yet, power dissipation on memory access is still 3 times more than that spent on logic operations.

Optical Artificial Neural Networks

Optical artificial neural network has been a topic of research since the 1980s. We review representative work in this field. As will become clear, the field of ANN is experiencing a resurgence after a relatively long dormant period.

All-Optical ANNs based on Holography

In the 1980s, there is a body of work aimed at realizing all-optical ANNs for pattern recognition. Representatively work on face recognition using photorefractive (PR) volume holograms and nonlinear Fabry-Perot (FP) resonators [34], [35] remain the only complete all-optical ANN to date as all functionalities (both neural network training and pattern recognition) and all building blocks were realized using optics. Even though this prior art demonstrated that optics can perform pattern recognition based on ANNs, it has the following disadvantages:

high power consumption required to activate the nonlinear FP resonator, and limited scalability because of the dynamic range of the photorefractive holograms slow training speed limited by the PR carrier transport lifetime, on the order of milliseconds.

prevented it from meaningful practical applications.

Machine Learning Based on Diffractive Optics

In this prior art [36], a multi-plane optical diffraction network was used to perform pattern recognition, specifically as a digit classifier. The phase screens in the network were designed using machine learning techniques. Numerical tests on 10,000 images from the MNIST (Modified National Institute of Standards and Technology) handwritten digit dataset [11]. Experimental results using 3D printed phase screen showed an 88% match between simulation and experiments. In this classifier, free-space optical diffraction was used to build interconnects while the phase masks were used to both diversify the interconnects and establish the weight matrix for each diffraction layer.

All-optical digit classification was accomplished using a structure resembling ANNs. The classification system, however, is completely linear. As a result, only inputs that are orthogonal can be classified. Introducing nonlinearity would make it functional as a true neural network.

Deep-Learning All-Optical ANNs Based on Coherent Nanophotonics

In this work, matrix-vector multiplication was performed by propagating an array of coherent input optical signals through a reconfigurable silicon photonic integrated circuit (PIC). As a result, the output optical signals become the product of the PIC transfer matrix and the input signals.

It turns out that the transfer matrix of the silicon PIC can be set to any prescribed weight matrix. This is because any real-valued m×n matrix T can be decomposed as $T=U\Sigma V^\dagger$ through singular-value decomposition (SVD), where U and V are m×m and n×n unitary matrices, and $\Sigma$ is an m×n real-valued rectangular diagonal matrix. It has also been shown that any unitary transformations can be implemented with optical beam splitters and phase shifters [37].

In [38], the beam splitters and phase shifters were realized in silicon waveguide Mach-Zehnder (MZ) interferometers. To realize an all-optical ANN, the nonlinear activation function also has to be implemented in the optical domain. In [38], saturable absorbers were proposed to provide the optical nonlinear activation function. In the actual experimental implementation, the nonlinear activation was still performed in the electrical domain.

The PIC is a coherent multiple-input-multiple-output (MIMO) system with its transfer matrix set to be the weight matrix. The beauty of this approach is that an integrated PIC performs both multiplication and accumulation for matrix-vector multiplication, without actively consuming any power. In [38], the PIC has 54 MZs occupying an area of about 1.2×0.5 cm. A 12" wafer thus can support about 60,500 MZs, or roughly 250×250 MZs. As a result, "the footprint of directional couplers and phase modulators makes scaling to large (N>1000) numbers of neurons very challenging[39]," while typical applications require 100,000 neurons [38].

Deep-Learning Photoelectronic ANN Based on TDM and Coherent Mixing

This is a hybrid approach in which MAC operations were executed in the optical domain and nonlinear activation in the electrical domain [39]. Digit classification is demonstrated using numerical simulations. Energy consumption per MAC lower than state-of-the-art electronics was predicted.

Vector-vector multiplication was executed by element-wise coherent optical mixing between a time-division multiplexed (TDM) signal and a TDM local oscillator (LO) and accumulation was performed on the photo-detected signal by low-pass filtering, which is equivalent to integration. Matrix-vector multiplication was then accomplished by exploiting the parallelism of free space.

Because the weight matrix is generated by temporal modulation, this configuration enables ultrafast ANN training. It was also argued that the energy consumption per MAC can be much lower than electronics. However, in general, ANN weight matrix can be updated slowly, and eventually remains in a steady state. But in this configuration, the weight matrix always needs power-hungry high-speed modulation even for static weights, since accumulation is implemented by temporal integration. Furthermore, this construction has a direct implication to its scalability. Let us assume that the integration time for MAC is 1 ns, corresponding to a 1 GHz clock rate for electronic nonlinear activation. Assuming a maximum modulation speed of 500 GHz, the number of weights per column is limited to 500, not much more than TPUs. Of less concern is that this construction is not compatible with all-optical ANN.

Summary

In the table of FIG. 3, the performance of photonic accelerators and compare with state-of-the-art electronics is summarized. As described above, scalability is one of the most important metrics. We did not list energy efficiency here as it needs rigorous, systematic accounting, even though all of the optical techniques have the potential to be energy efficiency because multiplications are passive. Each of the optical techniques offers important innovations that we can learn from. As will be shown below, incorporating these innovations and our multi-dimensional approach disclosed here should enable the photonic tensor accelerators (PTA) to finally overtake electronics in terms of scalability.

Examples of the disclosed inventions use optical and photonic methods that 1) offer orders-of-magnitude higher scalability and speed over electronics, 2) are fast, programmable, ideally compatible with training as well as inference, and 3) lower the power-consumption density so as to enable ANNs that are competitive over their pure electronic counterparts, at least for certain classes of AI functionalities. It is worth noting that:

- ANNs only require special operations/computations (e.g. MACs) that are especially suited for photonic accelerators, not general-purpose computing.
- Because ANNs are robust against variabilities in data dynamic range and nonlinear activation [40], analog photonic accelerators could achieve comparable performance as their digital logic counterparts.

Examples of The Present Invention

Wavelength-Encoded and Mode-Encoded Matrix-Vector Multiplication Accelerator

Figure 4A:
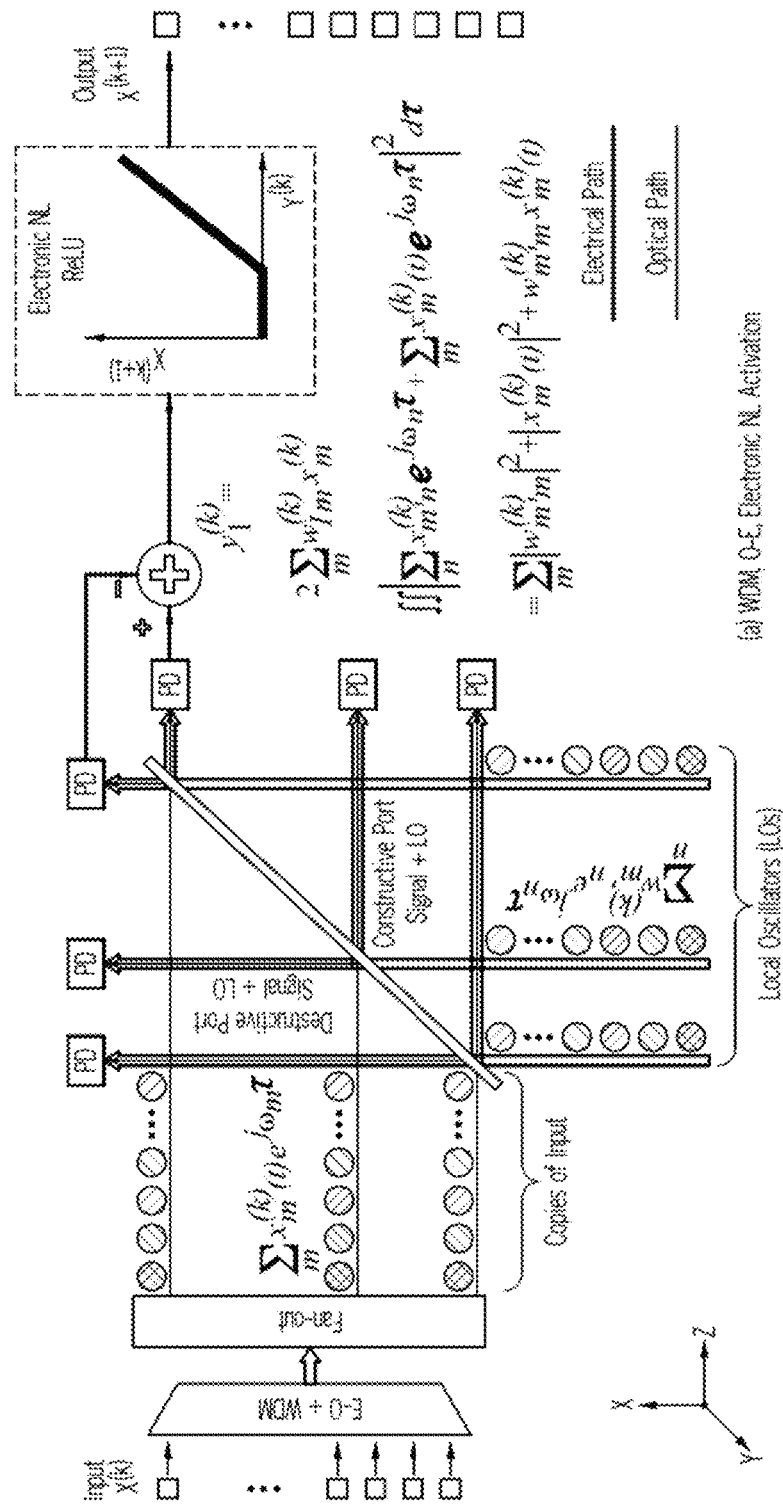
FIG. 4A is a schematic of node layers based on wavelength-encoded photonic matrix accelerator and FIG. 4B is a schematic of node layers based on mode-encoded photonic matrix accelerator.
Figure 4B:
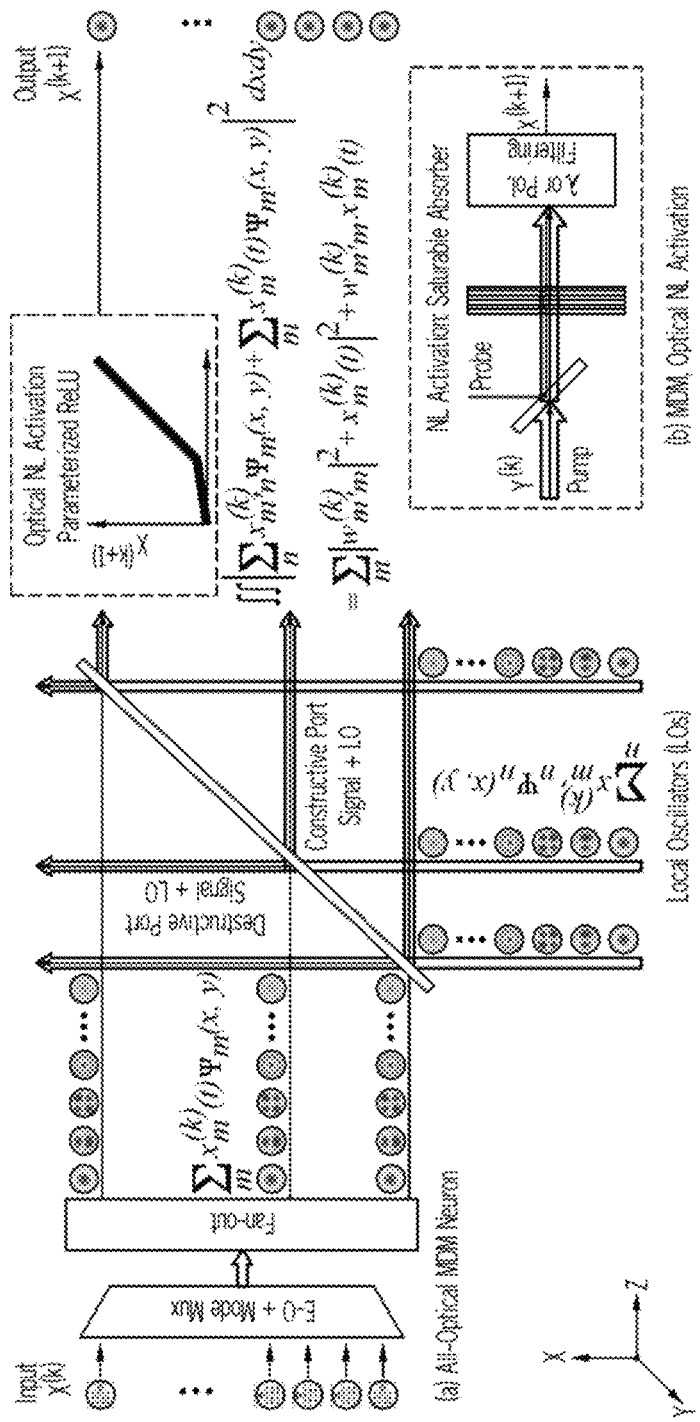

The matrix-vector multiplication in FIG. 4A and FIG. 4B has a single similarity to [39] in that multiplications are performed through coherent mixing and square-law detection. There are major differences between our approach and [39]: while accumulation in [39] is performed in the temporal domain, accumulation in our approach is performed in the wavelength, spatial and all other non-temporal domain/ degree of freedom/dimension of light. In FIG. 4A and FIG. 4B, the input vector and the weight vector are element-wise projected onto distinction wavelengths or spatial modes [for example, the Hermite-Gauss (HG) modes]. The wavelength-encoded or the mode-encoded input vector is fanned out into a desired number of copies and mixed with the corresponding wavelength-encoded or mode-encoded LOs containing the weight vectors comprising the weight matrix. Because of orthogonality among wavelengths or spatial modes [41], coherent mixing between a pair of signal and LO [FIG. 4A] or [FIG. 4B] streams produces the vector-vector multiplication, and 2D spatial parallelization produces the matrix-vector multiplication as a whole. The known abbreviations are used in FIG. 4A and FIG. 4B are as follows i) E-O—Electrical-to-Optical conversion, ii) PD—PhotoDetector, iii) WDM—Wavelength-Division-Multiplexing, iv) O-E—Optical-to-Electrical Conversion, v) NL—NonLinear, vi) MDM—Mode-Division Multiplexing, and vii) Pol.—Polarization.

Reviewing FIG. 4A and FIG. 4B shown are the node layers based on the (a) wavelength-encoded and (b) mode-encoded photonic matrix accelerators. The photonic accelerators are parallelized in the 2D (x, z) plane to perform matrix-vector multiplication, and, together with (a) electronic nonlinear activation after photo-detection and b) optical nonlinear activation using a saturable absorber, form a node layer. Both electronic and optical nonlinear activations are compatible with either wavelength encoding, or mode encoding, or combined wavelength-encoded/mode-encoded photonic accelerators. Here the input data is represented in the wavelength or mode dimension, the weight matrix is represented in the 2D (wavelength or mode, z) dimensions, and output ports are in the xdimension. Accumulation is in the wavelength (a) or mode (b) dimension, respectively.

The output of the wavelength-encoded and mode-encoded photonic matrix accelerator can be converted into electrical signals through balanced detection to serve as the input for electronic nonlinear activation, as shown in FIG. 4A. Alternatively, the output can be input directly into and serve as the pump for the optical nonlinear activation unit, such as the saturable absorber (SA) as shown in FIG. 4B [probe wave at longer wavelength or orthogonal polarization]. Consequently, the wavelength-encoded and/or mode-encoded matrix accelerator is compatible with either all-optical ANNs or hybrid optoelectronic ANNs.

There are several approaches to realize mode (de)multiplexers including cascaded directional couplers [42], [43], photonic lanterns [44]-[46] and multi-plane light converters (MPLC) [47]-[49].

The major advantage of the wavelength-encoded and/or mode-encoded matrix accelerator and the photonic tensor accelerator (PTA) is their scalability. Utilizing mode encoding alone, our matrix accelerator can be scaled to at least 300×300. MPLC mode multiplexers have a wide operating wavelength range and are, therefore, wavelength encoding. Combining wavelength-encoding and mode-encoding, we can potentially scale matrix-vector multiplication to an unprecedented size by combining wavelength and mode into one hyper-dimension so that the length of vector becomes the product of the number of wavelengths and the number of modes. With today's technology, we can readily employ more than 300 wavelengths with a channel spacing of 10 GHz in the C-band and 300 modes, leading to a vector length of 90,000. This is because interference (multiplication) of the wavelength-encoded and mode-encoded signal and LO—streams can be accumulated on a single detector. The size of the matrix is 90,000× [degrees of 2D (x, z) spatial parallelization], the latter can easily exceed 100, making the total MACs of this wavelength-encoded and- mode-encoded accelerator at least 9,000,000, with 2D spatial parallelization.

Polarization and quadrature encoding can each double the scale of matrix-vector multiplication. We will combine polarization and mode dimensions together as a single dimension called vector mode from here on.

Matrix-Matrix Multiplication Accelerator

Figure 5:
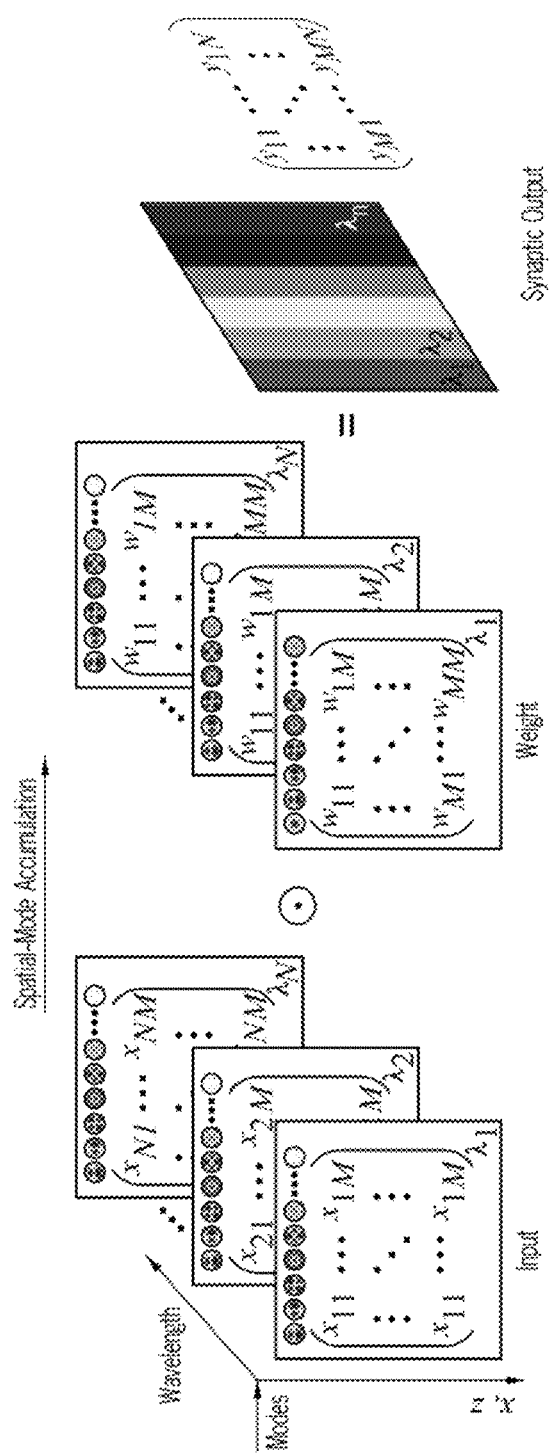
FIG. 5 is a schematic of the mapping scheme for matrix-matrix multiplication.

Examples of the present invention enables matrix-matrix multiplication of unprecedented sizes by 3D spatial parallelization further into the y direction. In this case, the input matrix is represented in the (wavelength and/or mode, y) dimensions, the weight matrix is in the (wavelength and/or mode, z) dimensions and replicated in the y direction, and the output matrix is contained in (x, y), as demonstrated in FIG. 5.

General Tensor Multiplication Accelerator

In total, there are many dimensions (wavelength, vector mode, quadrature, and three (3) dimensions of space) of light at our disposal to construct photonic accelerators. Using the three dimensions of space is natural in free space implementations, and two dimensions of space are natural for ICs or PICs. Any two (three) dimensions can be used to construct photonic accelerators for matrix-vector (matrix-matrix) multiplications. Multiple dimensions (e.g., wavelength-mode described above) can be combined into a hyper dimension to increase the scalability. Vector mode is the combination of spatial and polarization modes. Similarly, each dimension can be used independently to construct a photonic tensor accelerator (PTA) for batch matrix-multiplication operations. For example, the wavelength-mode-dimensions can be used to represent a batch of images (3D data cube), which can then be multiplied by a weight matrix, i.e., accelerated together, all at once in one clock cycle. Alternatively, each dimension with a large number parameters can be divided into mutually orthogonal subsets to effectively increase the number of independent/orthogonal degrees of freedom. Wavelength, for example, has many more parameters than polarization which has only 2 parameters. Space is another degree of freedom that has a very large number of parameters to divide into mutually orthogonal subsets. This is especially useful in performing tensor-tensor multiplication.

NON-LIMITING EXAMPLES

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated.

The terminology used herein was chosen to best explain the principles of the embodiments, the practical application or technical improvement over technologies found in the marketplace, or to enable others of ordinary skill in the art to understand the embodiments disclosed herein.

INCORPORATED REFERENCES

The following publications are each incorporated by reference in their entirety:

Incorporated References Listed in the Information Disclosure

[1] R. F. Rutz, "Transistor-Like Device Using Optical Coupling Between Diffused P-N Junctions in GaAs," Proc. IEEE, 1963.

[2] K. Jain and G. W. Pratt, "Optical transistor," Appl. Phys. Lett., vol. 28, no. 12, pp. 719-721, June 1976.

[3] H. F. Taylor, "Guided wave electrooptic devices for logic and computation," Appl. Opt., vol. 17, no. 10, p. 1493, May 1978.

[4] M. N. Islam, "Ultrafast all-optical logic gates based on soliton trapping in fibers," Opt. Lett., vol. 14, no. 22, p. 1257, November 1989.

[5] J. W. Goodman, "Operations Achievable with Coherent Optical Information Processing Systems," Proc. IEEE, 1977.

[6] D. A. B. Miller, "Are optical transistors the logical next step?," Nat. Photonics, vol. 4, no. 1, pp. 3-5, January 2010.

[7] S. A. Manayski, "CUDA compatible GPU as an efficient hardware accelerator for AES cryptography," in ICSPC 2007 Proceedings—2007 IEEE International Conference on Signal Processing and Communications, 2007.

[8] G. Quintana-Orti, F. D. Igual, E. S. Quintana-Orb, and R. A. van de Geijn, "Solving dense linear systems on platforms with multiple hardware accelerators," ACM SIGPLAN Not., 2009.

[9] M. Abadi et al., "TensorFlow: A System for Large-Scale Machine Learning This paper is included in the Proceedings of the TensorFlow: A system for large-scale machine learning," Proc 12th USENIX Conf. Oper. Syst. Des. Implement., 2016.

[10] Y. Jia et al., "Caffe: Convolutional Architecture for Fast Feature Embedding," 2014.

[11] "The MNIST Database." [Online]. Available: http://yann.lecun.com/exdb/mnist/.

[12] "The UCF 101 Dataset." [Online]. Available: https://www.crcv.ucf.edu/data/UCF101.php.

[13] "The ImageNet Dataset." [Online]. Available: http://www.image-net.org/.

[14] B. Hinton, G., Deng, L., Yu, D., Dahl, G., Mohamed, A., Jaitly, N., . . . Kingsbury, "Deep Neural Networks for Acoustic Modeling in Speech Recognition.," IEEE Signal Processing Magazine, 2012.

[15] "IMAGENET Large Scale Visual Recognition Challenge." [Online]. Available: http://image-net.org/challenges/LSVRC/2017/results.

[16] D. Silver et al., "Mastering the game of Go with deep neural networks and tree search," Nature, 2016.

[17] H. J. Caulfield and S. Dolev, "Why future supercomputing requires optics," Nat. Photonics, vol. 4, no. 5, pp. 261-263, May 2010.

[18] D. Brunner, S. Reitzenstein, and I. Fischer, "All-optical neuromorphic computing in optical networks of semiconductor lasers," in 2016 IEEE International Conference on Rebooting Computing, ICRC 2016—Conference Proceedings, 2016.

[19] T. Deng, J. Robertson, and A. Hurtado, "Controlled Propagation of Spiking Dynamics in Vertical-Cavity Surface-Emitting Lasers: Towards Neuromorphic Photonic Networks," IEEE J. Sel. Top. Quantum Electron., 2017.

[20] T. Ferreira de Lima, B. J. Shastri, A. N. Tait, M. A. Nahmias, and P. R. Prucnal, "Progress in neuromorphic photonics," Nanophotonics, 2017.

[21] A. N. Tait et al., "Neuromorphic photonic networks using silicon photonic weight banks," Sci. Rep., 2017.

[22] H. T. Peng, M. A. Nahmias, T. F. De Lima, A. N. Tait, B. J. Shastri, and P. R. Prucnal, "Neuromorphic Photonic Integrated Circuits," IEEE J. Sel. Top. Quantum Electron., 2018.

[23] J. K. George et al., "Neuromorphic photonics with electro-absorption modulators," Opt. Express, vol. 27, no. 4, p. 5181, February 2019.

[24] K. Vandoorne et al., "Toward optical signal processing using Photonic Reservoir Computing," Opt. Express, vol. 16, no. 15, p. 11182, July 2008.

[25] F. Duport, B. Schneider, A. Smerieri, M. Haelterman, and S. Massar, "All-optical reservoir computing," Opt. Express, 2012.

[26] L. Pesquera et al., "Photonic information processing beyond Turing: an optoelectronic implementation of reservoir computing," Opt. Express, vol. 20, no. 3, p. 3241, 2012.

[27] Y. Paquot et al., "Optoelectronic reservoir computing," Sci. Rep., 2012.

[28] A. Dejonckheere et al., "All-optical reservoir computer based on saturation of absorption," Opt. Express, 2014.

[29] L. Larger, A. Baylón-Fuentes, R. Martinenghi, V. S. Udaltsov, Y. K. Chembo, and M. Jacquot, "High-speed photonic reservoir computing using a time-delay-based architecture: Million words per second classification," Phys. Rev. X, 2017.

[30] A. Katumba, J. Heyvaert, B. Schneider, S. Uvin, J. Dambre, and P. Bienstman, "Low-Loss Photonic Reservoir Computing with Multimode Photonic Integrated Circuits," Sci. Rep., 2018.

[31] N. P. Jouppi et al., "In-Datacenter Performance Analysis of a Tensor Processing Unit," in Proceedings of the 44th Annual International Symposium on Computer Architecture—ISCA '17, 2017, pp. 1-12.

[32] M. Mathieu, M. Henaff, and Y. LeCun, "Fast Training of Convolutional Networks through FFTs," pp. 1-9, 2013.

[33] A. Krizhevsky, I. Sutskever, and G. E. Hinton, "ImageNet Classification with Deep Convolutional Neural Networks," Adv. Neural Inf. Process. Syst., pp. 1-9, 2012.

[34] K. Wagner and D. Psaltis, "Multilayer optical learning networks," Appl. Opt., vol. 26, no. 23, p. 5061, December 1987.

[35] D. Psaltis, D. Brady, X. G. Gu, and S. Lin, "Holography in artificial neural networks.," Nature, vol. 343, no. 6256, pp. 325-30, 1990.

[36] X. Lin et al., "All-optical machine learning using diffractive deep neural networks," Science (80-.)., 2018.

[37] M. Reck, A. Zeilinger, H. J. Bernstein, and P. Bertani, "Experimental realization of any discrete unitary operator," Phys. Rev. Lett., 1994.

[38] Y. Shen et al., "Deep learning with coherent nanophotonic circuits," Nat. Photonics, vol. 11, no. 7, pp. 441-446, July 2017.

[39] R. Hamerly, A. Sludds, L. Bernstein, M. Soljačić, and D. Englund, "Large-Scale Optical Neural Networks based on Photoelectric Multiplication," arXiv Prepr. arXiv1812.07614, pp. 1-18, November 2018.

[40] P. Merolla, R. Appuswamy, J. Arthur, S. K. Esser, and D. Modha, "Deep neural networks are robust to weight binarization and other non-linear distortions," arXiv Prepr. arXiv1606.01981, June 2016.

[41] Y. Wang, N. Zhao, Z. Yang, Z. Zhang, B. Huang, and G. Li, "Few-mode SDM receivers exploiting parallelism of free space," IEEE Photonics Journal, 2019.

[42] B. Huang, C. Xia, G. Matz, N. Bai, and G. Li, "Structured Directional Coupler Pair for Multiplexing of Degenerate Modes," 2013.

[43] Y. Gao et al., "Non-circularly-symmetric Mode-group Demultiplexer Based on Fused-type FMF Coupler for MGM Transmission," 2018.

[44] T. A. Birks, I. Gris-Sanchez, S. Yerolatsitis, S. G. Leon-Saval, and R. R. Thomson, "The photonic lantern," Adv. Opt. Photonics, 2015.

[45] B. Huang et al., "All-fiber mode-group-selective photonic lantern using graded-index multimode fibers," Opt. Express, 2015.

[46] B. Huang et al., "Triple-clad photonic lanterns for mode scaling," Opt. Express, 2018.

[47] G. Labroille, B. Denolle, P. Jian, J. F. Morizur, P. Genevaux, and N. Treps, "Efficient and mode selective spatial mode multiplexer based on multi-plane light conversion," in 2014 IEEE Photonics Conference, IPC 2014, 2014.

[48] N. K. Fontaine, R. Ryf, H. Chen, D. T. Neilson, K. Kim, and J. Carpenter, "Scalable mode sorter supporting 210 Hermite-Gaussian modes," 2018.

[49] S. Bade et al., "Fabrication and Characterization of a Mode-selective 45-Mode Spatial Multiplexer based on Multi-Plane Light Conversion," in Optical Fiber Communication Conference Postdeadline Papers, 2018, p. Th4B.3.

[50] Z. I. Borevich and S. L. Krupetskii, "Subgroups of the unitary group that contain the group of diagonal matrices," J. Soy. Math., 1981.

[51] J.-F. Morizur et al., "Programmable unitary spatial mode manipulation," J. Opt. Soc. Am. A, vol. 27, no. 11, p. 2524, November 2010.

[52] H Takahashi, T. Saida, Y. Sakamaki, and T. Hashimoto, "Wavefront matching method: A new approach for need-oriented waveguide design," in Conference Proceedings—Lasers and Electro-Optics Society Annual Meeting-LEOS, 2005.

[53] T. Umezawa et al., "10-GHz 32-pixel 2-D photodetector array for advanced optical fiber communications," 2017.

[54] D. J. Brady et al., "Multiscale gigapixel photography," Nature, vol. 486, no. 7403, pp. 386-389, 2012.

[55] L. Gao, J. Liang, C. Li, and L. V Wang, "Single-shot compressed ultrafast photography at one hundred billion frames per second," Nature, vol. 516, no. 7529, pp. 74-77, 2014.

[56] K. Simonyan and A. Zisserman, "Very Deep Convolutional Networks for Large-Scale Image Recognition," pp. 1-14, 2014.

What is claimed is:

1. A photonic unit for vector multiplication comprising:
a first optical multiplexer that receives and multiplexes a first set of optical signals to produce a first multiplexed optical signal representing a first vector, wherein each element in the first vector is encoded on a different optical signal of the first set of optical signals, each optical signal of the first set of optical signals have a different degree of freedom (DOF)/dimension of light to the other optical signals of the first set of optical signals and is non-temporal during one multiplication cycle;
a second optical multiplexer that receives and multiplexes a second set of optical signals, to produce a second multiplexed optical signal, representing a second vector, each element in the second vector is encoded on a different optical signal of the second set, wherein each optical signal of the second set of optical signals has a different degree of freedom (DOF)/dimension to the other optical signals of the second set, and that is identical to one of the optical signals of the first set of optical signals and is non-temporal during a vector multiplication cycle; and
a beam combiner that receives and combines the first multiplexed optical signal from the first optical multiplexer and second multiplexed optical signal from the second optical multiplexer to produce an interference between the first multiplexed optical signal and second multiplexed optical signal containing multiplication results of the first vector and the second vector in a total interference intensity.

2. The photonic unit of claim 1, wherein each optical signal of the first set of optical signals have the different degree of freedom (DOF)/dimension of light used for encoding thereof is one of a wavelength, a spatial mode, a polarization, a quadrature, a component of a wave vector, or a combination thereof.

3. The photonic unit of claim 1, wherein each optical signal of the first set of optical signals have the different degree of freedom (DOF)/dimension of light used for encoding is a hyperdimension consisting of combinations of two or more degree of freedoms (DOFs)/dimensions of light.

4. The photonic unit of claim 2, wherein the spatial mode is one of:
Hermite-Gaussian modes,
Laguerre-Gaussian modes,
discrete spatial samples forming spatially orthonormal basis, or
a combination thereof.

5. The photonic unit of claim 2, wherein an interference signal enters a nonlinear optical element.

6. The photonic unit of claim 2, wherein the total interference intensity is converted into an electrical signal.

7. The photonic unit of claim 6, wherein the electrical signal enters a nonlinear electrical element.

8. A photonic unit for N by M matrix-with M by 1 vector multiplication comprising:
a first optical multiplexer that receives and multiplexes a first set of optical signals to produce a first multiplexed optical signal representing a M by 1 vector with M elements, wherein each element in the M by 1 vector is encoded on a different optical signal of the first set of optical signals, each optical signal of the first set of optical signals having a different orthogonal degree of freedom (DOF)/dimension of light to the other optical signals of the first set of optical signals and is non-temporal during one matrix-vector multiplication cycle, and wherein M is a positive integer greater than or equal to 1;
an optical duplicator for reproducing the first multiplexed optical signal representing the M by 1 vector to provide N copies, wherein N is a positive integer greater than 1;
a set of N additional optical multiplexers each receiving and multiplexing a different set of M optical signals from a group of N sets of M optical signals to produce N multiplexed optical signals, wherein each of set of M optical signals represents a different independent row of the M by N matrix, and wherein each element in a row of the M by N matrix is encoded on a different optical signal of its respective set of M optical signals, and wherein each o I signal of each set of M optical signals has a different degree of freedom (DOF)/dimension of light and that is identical to the degree of freedom (DOF)/dimension of light of one of the optical signals of the first set of optical signals and is no-temporal during a matrix-vector multiplication cycle; and
at least one beam combiner that receives the N copies of the first multiplexed optical signal and the N second multiplexed optical signals and combines them to produce N occurrences of interferences between the first optical signal and each of the N second optical signals containing multiplication results of the M by N matrix and the M by 1 vector in N total interference intensities.

9. The photonic unit of claim 8, wherein at least one of the first set of optical signals and the second set of optical signals that uses different orthogonal degrees of freedom (DOF)/dimension of is one of a wavelength, a spatial mode, a polarization, a quadrature, a component of a wave vector, or combination thereof.

10. The photonic unit of claim 8, wherein the at least one of the first set of optical signals and the second set of optical signals that uses different orthogonal degree of freedom (DOF)/dimension of light is a hyperdimension consisting of combinations of two or more degree of freedoms (DOFs)/dimensions of light.

11. The photonic unit of claim 8, wherein the first set of optical signals and the second set of optical signals that uses different orthogonal degree of freedom (DOF)/dimension of light are non-overlapping subsets of a dimension or a hyperdimension of light.

12. The photonic unit of claim 9, wherein the spatial mode is one of:
Hermite-Gaussian modes,
Laguerre-Gaussian modes,
discrete spatial samples forming spatially orthonormal basis, or
a combination thereof.

13. The photonic unit of claim 8, wherein at least one interference signal enters a nonlinear optical element.

14. The photonic unit of claim 8, wherein at least one total interference intensity is converted into an electrical signal.

15. The photonic unit of claim 14, wherein the electrical signal enters a nonlinear electrical element.

16. A photonic unit for a N by M matrix-with a M by W matrix multiplication comprising:
a set of N optical multiplexers each receiving and multiplexing a different set of M optical signals from a group of N sets of M optical signals to produce N multiplexed optical signals, wherein each of set of M optical signals represents a different independent row with M elements of a N by M matrix, and wherein each element in each independent row of the N by M matrix is encoded on a different optical signal of its respective set of M optical signals, and wherein each of optical signal of each set of M optical signals has a different degree of freedom (DOF)/dimension of light and that is identical to the degree of freedom (DOR)/dimension of light of optical signals of the set of N multiplexed optical signals and is non-temporal during one matrix-matrix multiplication cycle, and wherein M and N are each a positive integer greater than or equal to 1;

a first optical duplicator for reproducing each of the N multiplexed optical signals to provide W copies, wherein W is a positive integer greater than 1;

a set of W optical multiplexers each receiving and multiplexing a different set of M optical signals from a group of W sets of M optical signals to produce W multiplexed optical signals, wherein each of the set of W optical signals represents a different independent column with M elements of the M by W matrix, and wherein each element in each independent column of the M by W matrix is encoded on a different optical signal of its respective set of W optical signals, and herein each optical signal of each set of W optical signals has a different degree of freedom (DOF)/dimension of light and that is identical to degree of freedom (DOF)/dimension of light of one of the optical signals of the set of W multiplexed optical signals and is non-temporal during matrix-matrix multiplication cycle;

a second optical duplicator for reproducing each of the W multiplexed optical signals to provide N copies wherein W is the positive integer greater than 1; and at least one beam combiner that receives two sets of N by W multiplexed optical signals representing appropriately duplicated rows or columns of each of the N by M matrix and the M by W matrix so as to combine them to produce N by W occurrences of interferences between each of row of the N by M matrix and the column of the M by W matrix containing multiplication results in N by W total interference intensities.

17. The photonic unit of claim 16, wherein the at least one of the first, the second, and the third orthogonal degree of freedom (DOF)/dimension of light used for encoding, or duplication is one of a wavelength, a spatial mode, a polarization, a quadrature, a component of a wave vector, or combination thereof.

18. The photonic unit of claim 16, wherein the at least one of the first, the second, and the third orthogonal degree of freedom (DOF)/dimension used for encoding, or duplication is a hyperdimension consisting of combinations of two or more degree of freedoms (DOFs)/dimensions of light.

19. The photonic unit of claim 16, wherein at least two of the first, the second and the third orthogonal degree of freedom (DOF)/dimension of light used for encoding, or duplication are non-overlapping subsets of a dimension or a hyperdimension of light.

20. The photonic unit of claim 17, wherein the spatial mode is one of:
Hermite-Gaussian modes,
Laguerre-Gaussian modes,
discrete spatial samples forming spatially orthonormal basis, or
combination thereof.

* * * * *